United States Patent
Bahler et al.

(10) Patent No.: US 10,697,341 B2
(45) Date of Patent: Jun. 30, 2020

(54) METHOD FOR ACTUATING AN ELECTRICALLY CONTROLLABLE REDUCING AGENT DOSING VALVE OF AN INTERNAL COMBUSTION ENGINE

(71) Applicant: Robert Bosch GmbH, Stuttgart (DE)

(72) Inventors: Alexander Bahler, Backnang (DE); Edna Boos, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 15/949,062

(22) Filed: Apr. 9, 2018

(65) Prior Publication Data
US 2018/0306079 A1    Oct. 25, 2018

(30) Foreign Application Priority Data
Apr. 25, 2017  (DE) .......... 10 2017 206 907

(51) Int. Cl.
*F01N 9/00*   (2006.01)
*F01N 3/20*   (2006.01)

(52) U.S. Cl.
CPC .......... *F01N 3/208* (2013.01); *F01N 9/00* (2013.01); *F01N 2610/02* (2013.01); *F01N 2610/144* (2013.01); *F01N 2610/146* (2013.01); *F01N 2610/148* (2013.01); *F01N 2610/1433* (2013.01); *F01N 2610/1453* (2013.01); *F01N 2900/0416* (2013.01); *F01N 2900/0601* (2013.01); *F01N 2900/1808* (2013.01)

(58) Field of Classification Search
CPC ..... F01N 2900/1808; F01N 2900/1821; F01N 2900/1822
See application file for complete search history.

(56) References Cited

U.S. PATENT DOCUMENTS

| | | | | |
|---|---|---|---|---|
| 2008/0295492 | A1* | 12/2008 | Karkkainen | F01N 3/025 60/286 |
| 2010/0139254 | A1* | 6/2010 | Sebestyen | F01N 11/00 60/286 |
| 2011/0239625 | A1* | 10/2011 | Fokkelman | F01N 3/206 60/274 |

FOREIGN PATENT DOCUMENTS

DE    102007017459    10/2008

\* cited by examiner

*Primary Examiner* — Jonathan R Matthias
(74) *Attorney, Agent, or Firm* — Michael Best & Friedrich LLP

(57) ABSTRACT

A reducing agent dosing valve (24) on an exhaust system (12) of an internal combustion engine (10), having a pump (32) which generates an injection pressure (p_24), and having a control unit (14) which actuates the reducing agent dosing valve (24) with actuation signals is presented, wherein the actuation signals are formed in a manner dependent on a reducing agent pressure (p_36) prevailing at the pump side. The method is distinguished by the fact that the actuation signals are formed additionally in a manner dependent on at least one estimated value for an influence of a drop in the injection pressure (p_24), which occurs upon the opening of the reducing agent dosing valve (24), on the injected reducing agent quantity.

14 Claims, 7 Drawing Sheets

METHOD FOR ACTUATING AN ELECTRICALLY CONTROLLABLE REDUCING AGENT DOSING VALVE OF AN INTERNAL COMBUSTION ENGINE

BACKGROUND OF THE INVENTION

The present invention relates to a method for actuating an electrically controllable reducing agent dosing valve which is arranged on an exhaust system of an internal combustion engine, has an injection opening projecting into the exhaust system, and has a feed connector, which feed connector is hydraulically connected by means of a feed line to a pump which generates an injection pressure at the feed connector, having a control unit which is connected to a control connector of the reducing agent dosing valve and which actuates the reducing agent dosing valve with actuation signals, to which the reducing agent dosing valve reacts with an opening action which takes place as a result of hydraulic connection of the feed connector to the injection opening, wherein the actuation signals are formed in a manner dependent on a reducing agent pressure prevailing at the pump-side end of the feed line. A method of said type serves for the actuation of an electrically controllable reducing agent dosing valve which is arranged on an exhaust system of an internal combustion engine, has an injection opening projecting into the exhaust system, and has a feed connector. The feed connector is hydraulically connected by means of a feed line to a pump which generates an injection pressure at the feed connector. A control unit is connected to a control connector of the reducing agent dosing valve and actuates the reducing agent dosing valve with actuation signals, to which the reducing agent dosing valve reacts with an opening action which takes place as a result of a hydraulic connection of the feed connector to the injection opening. The actuation signals are formed in a manner dependent on a reducing agent pressure prevailing at the pump-side end of the feed line.

A method of said type and a device of said type are known from DE 10 2007 017 459. In known reducing agent dosing systems, the reducing agent quantity for injection is controlled by means of the actuation duration with opening action and/or opening frequency of the reducing agent dosing valve. In part, in the formation of the actuation signals, the actuation duration is formed in a manner dependent on a pressure instantaneously measured in the reducing agent dosing system, and in part, to form the actuation signals, use is also made merely of a nominal pressure, which prevails in the reducing agent dosing system and which is predefined for example by a pressure-limiting valve. The formation of the actuation signals is performed with the aim of covering the reducing agent demand of an exhaust-gas purification system, for example of an SCR system. The formation of the actuation signals is therefore performed for example in a manner dependent on the mass flow and the composition of the exhaust gas for purification. In the known systems, deviations of the actually dosed reducing agent quantity with respect to the reducing agent quantity that is intended to be injected with determined actuation signals arise. Such deviations can impair the function of the exhaust-gas purification system.

SUMMARY OF THE INVENTION

By virtue of the fact that the actuation signals are formed additionally in a manner dependent on at least one estimated value for an influence of a drop in the injection pressure, which occurs at the feed connector of the reducing agent dosing valve upon the opening of the reducing agent dosing valve, on the injected reducing agent quantity, greater accuracy of the dosing of the reducing agent is achieved.

The invention is based on the realization that the reducing agent mass flow dosed by means of the reducing agent dosing valve in the prior art deviates from the expected value in particular at the start of the dosing. The inventors have recognized that these deviations are associated with oscillations of the reducing agent pressure which are incited by the opening of the reducing agent dosing valve. As a result of the opening of the reducing agent dosing valve, the reducing agent pressure in the reducing agent dosing valve immediately drops, firstly because mass is removed from the system, and secondly, owing to the inertia of the reducing agent, a continuous mass flow between the reducing agent pump and reducing agent dosing valve has not yet formed. During the duration of the pressure drop, the reducing agent mass flow via the reducing agent dosing valve is smaller than it would be without said pressure drop. The reduction lasts for the time duration of the pressure drop. If a pressure sensor is present in the reducing agent dosing system, said pressure sensor is normally mounted in or on the reducing agent pump, which is installed remote from the reducing agent dosing valve. Owing to the finite wave propagation speed, a delay in response of the pressure sensor and an elasticity of the line between the reducing agent pump and the reducing agent dosing valve, the pressure drop at the reducing agent dosing valve is reflected in the pressure signal of the pressure sensor only with a propagation time delay and response delay of the pressure sensor. Therefore, even if the reducing agent pump is operated in a pressure control loop which processes the pressure signal, the reducing agent dosing system as a whole cannot intervene with a counteracting control action, nor can it adequately take the actually reduced injection pressure into consideration in the calculation of the reducing agent quantity that has already been dosed within an actuation duration.

This is avoided in the case of the invention in that the formation of the actuation signals is performed in a manner dependent on the estimated value for the influence of the drop in the injection pressure on the injected reducing agent quantity. This results in the greater accuracy of the dosing of the reducing agent.

An advantageous refinement is distinguished by the fact that the at least one estimated value is determined on the basis of data stored in the control unit, which data, for predetermined actuation durations of the actuation signals, indicate predetermined offsets with respect to a reducing agent pressure prevailing at the pump side.

It is also preferable that a setpoint value for a reducing agent quantity for injection is determined, the reducing agent dosing valve is actuated with opening action, an instantaneous value for the pressure prevailing at the feed connector of the reducing agent dosing valve is repeatedly determined from a reducing agent pressure prevailing at the pump side and the offset, an actual value of the reducing agent quantity injected during the already ongoing opening of the reducing agent dosing valve is determined on the basis of the instantaneous values and is compared with the setpoint value, and the actuation with opening action is ended if the actual value reaches the setpoint value.

Such a lengthening of the opening time, which during the dosing has a corrective action on the basis of the instantaneously calculated deviation of setpoint quantity to actual quantity, is possible but is highly cumbersome. In an alternative refinement, it is simply the case that the actual value of the reducing agent quantity injected during the already ongoing opening of the valve is determined on the basis of the instantaneous values for the entire opening duration, wherein the pressure prevailing at the feed connector of the reducing agent dosing valve is determined from the reducing agent pressure prevailing at the pump side and the offset.

It is also preferable that a setpoint value for a reducing agent quantity for injection and an actuation duration, required for the injection of said reducing agent quantity, of an actuation signal that acts so as to open the reducing agent dosing valve are determined, the reducing agent dosing valve is actuated with opening action, an instantaneous value for the pressure prevailing at the feed connector of the reducing agent dosing valve is repeatedly determined from a reducing agent pressure prevailing at the pump side and the offset, an actual value of the reducing agent quantity injected during the already ongoing opening of the reducing agent dosing valve is determined on the basis of the instantaneous values, an actual actuation duration that has elapsed since the start of the actuation with opening action is repeatedly determined, the elapsed actual actuation duration is compared with the setpoint value of the actuation duration, and the actuation with opening action is ended if the elapsed actual actuation duration reaches the setpoint value of the actuation duration.

It is also preferable if the value for the reducing agent pressure prevailing at the pump-side end is determined using a pressure sensor arranged there.

A further preferred refinement is distinguished by the fact that the value for the reducing agent pressure prevailing at the pump-side end is a predetermined nominal pressure.

It is also preferable that the at least one estimated value indicates in each case one deficit quantity that is predetermined for a setpoint value of the actuation duration of an actuation signal or a predetermined base value of the reducing agent quantity. It is furthermore preferable that the deficit quantities are read out of a memory of the control unit which, for this purpose, is addressed with the predetermined setpoint values of the actuation durations or base values of the reducing agent quantity.

A further preferred refinement is distinguished by the fact that, in the formation of the actuation signals, a setpoint value for a reducing agent quantity for injection is determined, and that a setpoint value of an actuation duration, required for the injection of a reducing agent quantity corresponding to the setpoint value, of an actuation signal is determined, wherein the setpoint value is determined as a function of a predetermined nominal value or reducing agent pressure measured at the pump side, that, from the setpoint value of the actuation duration, by accessing data stored in the control unit, a deficit quantity is determined which arises owing to a pressure drop that can be expected during the opening of the reducing agent dosing valve, an additional duration is determined such that a lengthening of the setpoint value of the actuation duration by the additional duration leads to the injection of an additional quantity which compensates the deficit quantity, a sum of the additional duration and the setpoint value of the actuation duration is formed and is used for the actuation with opening action, an instantaneous value for the pressure prevailing at the feed connector of the reducing agent dosing valve is repeatedly determined from a reducing agent pressure prevailing at the pump side and the offset, an actual value of the reducing agent quantity injected during the already ongoing opening of the reducing agent dosing valve is determined on the basis of the instantaneous values, an actual actuation duration that has elapsed since the start of the actuation with opening action is repeatedly determined, the elapsed actual actuation duration is compared with the value of the sum, and the actuation with opening action is ended if the elapsed actual actuation duration reaches the value of the sum.

With regard to refinements of the reducing agent dosing device, it is preferable for the control unit to be designed, in particular programmed, to control a sequence of a method according to one of the claims.

Further advantages will emerge from the dependent claims, from the description and from the appended figures.

It is self-evident that the features mentioned above and the features yet to be discussed below may be used not only in the respectively specified combination but also in other combinations or individually without departing from the scope of the present invention.

BRIEF DESCRIPTION OF THE DRAWINGS

Exemplary embodiments of the invention are illustrated in the drawings and will be discussed in more detail in the following description, in which, in each case in schematic form.

DETAILED DESCRIPTION

Figure 1:
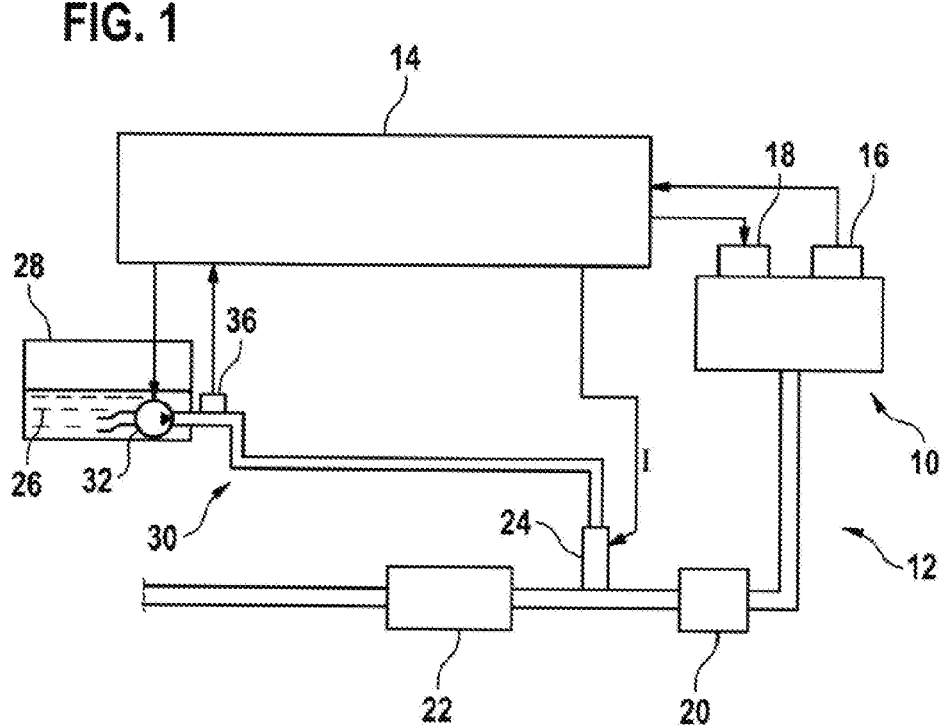
FIG. 1 shows the technical field of the invention.

FIG. 1 shows an internal combustion engine 10 having an exhaust system 12 and a control unit 14. The control unit 14 is preferably the control unit that controls the internal combustion engine 10 and, for this purpose, receives signals from a sensor arrangement 16 regarding operating parameters of the internal combustion engine 10 and processes said signals to form actuating variables for actuating elements 18 of the internal combustion engine 10. The signals from the sensor arrangement 16 typically enable the control unit 14 to determine the air mass drawn in by the internal combustion engine 10, the rotational angle position of a crankshaft of the internal combustion engine 10, a temperature of the internal combustion engine 10 etc. From these signals, the control unit 14 typically forms actuating variables for the dosing of fuel into combustion chambers of the internal combustion engine 10, for the setting of a charge pressure of an exhaust-gas turbocharger, of an exhaust-gas recirculation rate etc. Alternatively, the control unit 14 is a separate control unit which communicates with the control unit of the internal combustion engine 10 via a bus system. In any case, the control unit 14 is configured, in particular programmed, to carry out the method according to the invention and/or one of its refinements presented below, that is to say in each case to control the sequence of the method and perform the evaluations of input signals required for this purpose.

The exhaust system 12 has an oxidation catalytic converter 20 and an SCR catalytic converter 22. The arrangement of the SCR catalytic converter may deviate from the arrangement illustrated. It is essential that, upstream of the inlet of the SCR catalytic converter 22, there is arranged a reducing agent dosing valve 24 via which reducing agent 26 is dosed to the exhaust gas from a reservoir 28. No further components are situated between the reducing agent dosing valve and the SCR catalytic converter. The reducing agent dosing valve 24 is electromagnetically actuated and, for this purpose, is actuated by the control unit 14 with a control current I, which flows through a magnet coil of the reducing agent valve 24. Here, the supply of reducing agent 26 to the reducing agent valve 24 is performed via a feed line 30, which is fed with the reducing agent 26 by a pump 32, wherein the pump 32 generates the injection pressure for an injection of reducing agent 26 into the exhaust system 12, which is performed via the reducing agent dosing valve 24. The reducing agent pressure generated by the pump 32 at its connector of the reducing agent line 30 is detected by means of a pressure sensor 36 arranged there, and is transmitted to the control unit 14. The reducing agent dosing valve 24 is thus likewise an actuating element controlled by the control unit 14.

FIG. 1 thus shows in particular the technical field in which the invention is used. It is self-evident here that the invention is not restricted to the configuration, illustrated in FIG. 1, of internal combustion engine 10 with an exhaust system 12 and with the illustrated sensors 16, 36 and actuating elements 18, 24. It is accordingly possible for alternative refinements to have different sensors which detect operating parameters of the exhaust system 12 and provide corresponding measurement values to the control unit 14. Such sensors are, in one refinement, temperature sensors and/or sensors for detecting the $NO_x$ concentration in the exhaust gas upstream and/or downstream of the SCR catalytic converter 22 and/or a sensor which detects an ammonia concentration in the exhaust gas downstream of the SCR catalytic converter 22 and thus permits the detection of overdosing of reducing agent 26. The reducing agent dosing valve 24 may also be a piezoelectrically controlled valve.

Figure 2:
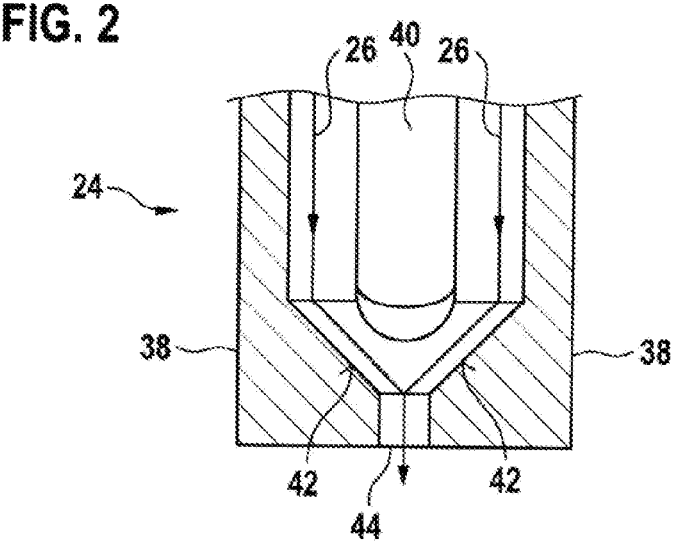
FIG. 2 shows mechanical and hydraulic details of the reducing agent dosing valve.

FIG. 2 shows mechanical and hydraulic details of the reducing agent dosing valve 24. The reducing agent dosing valve 24 has a valve body 38 which, during intended use, is fixedly connected to the exhaust system 12. A sealing body 40, for example a nozzle needle, is arranged in axially movable fashion in the valve body 38, which sealing body is pressed against a valve seat 42 by closing forces, and is lifted from the valve seat 42 by opening forces and in so doing opens up a throughflow cross section 44 via which reducing agent 26 is dosed into the exhaust system 12. FIG. 2 thus shows in particular an injection opening that projects into the exhaust system.

The nozzle needle is electromagnetically actuated. In an alternative, piezoelectric actuation is realized. In both cases, the actuation is performed by means of the control unit 14.

Figure 3:
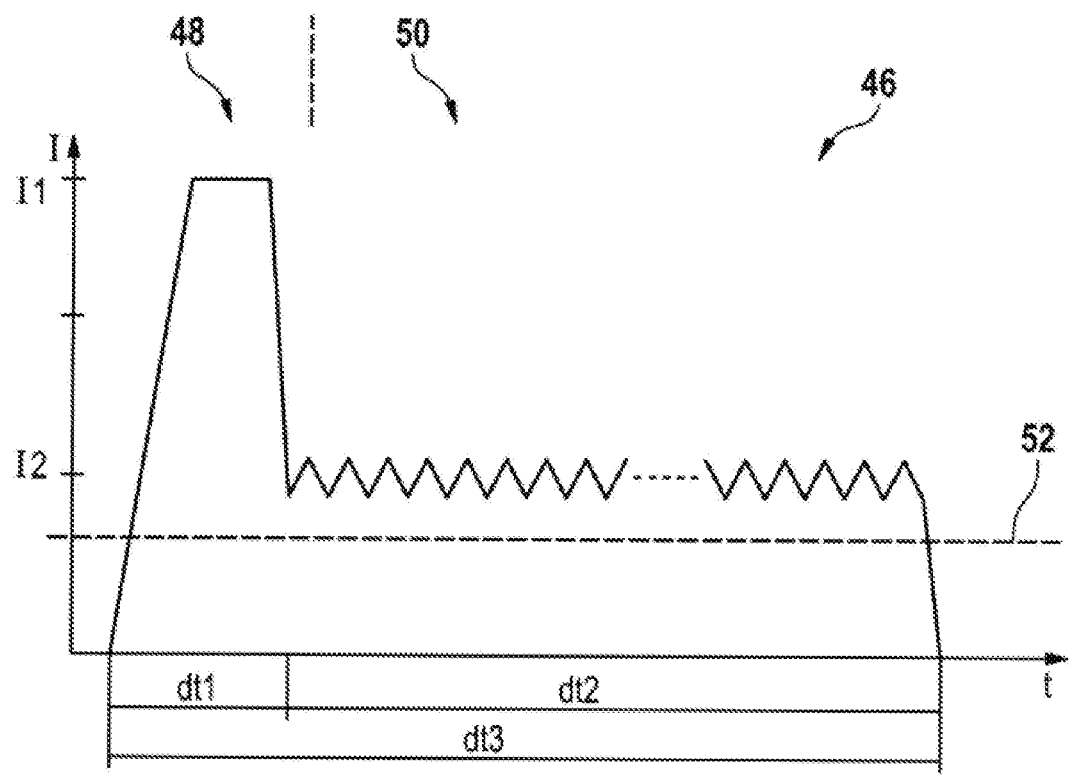
FIG. 3 shows a current profile with which the reducing agent dosing valve is actuated.

FIG. 3 shows a form of a current profile 46 with which the reducing agent dosing valve 24 is actuated in the case of electromagnetic actuation and which has two temporally successive subsections 48 and 50. Here, the horizontal dashed line 52 marks a holding current level 52 that is required for holding an open reducing agent dosing valve 24 in the open state. In the first sub section 48 of length dt1, the current I through the magnet coil of the reducing agent dosing valve 24 is set to a first, relatively high value I1 in order to open the reducing agent dosing valve 24 quickly. Following the first subsection 48, a relatively low current I2 is set in the second subsection 50 of length dt2. The relatively low current I2 however still runs above the dashed line that marks a holding current level 52. As a result, the reducing agent dosing valve 24 is, by means of the current profile 46, opened and held in the open state over the time period dt3. By contrast to the described holding current control, it would also be possible to use a more simple valve circuit configuration in the case of which the valve is operated with constant actuation.

Figure 4:
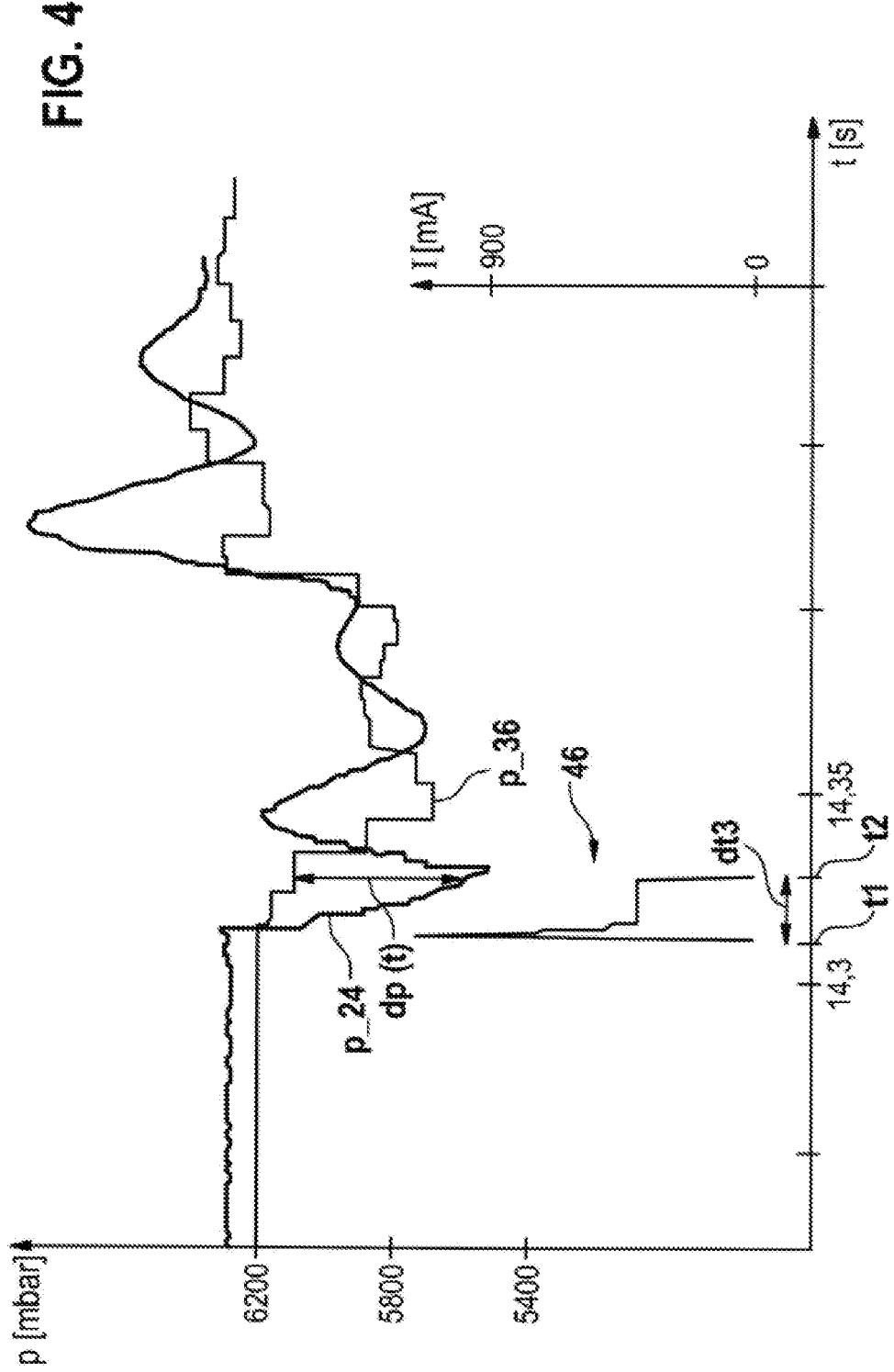
FIG. 4 shows profiles with respect to time of signals that arise during the injection of reducing agent in the technical field of the invention.

FIG. 4 shows a current profile 46 with which the reducing agent dosing valve 24 is opened between the times t1 and t2 for an actuation duration dt3. Typical values of the current I for this are plotted in mA on the right-hand abscissa. Before the opening time t1 and after the closing time t2, the reducing agent dosing valve 24 is closed. Before the opening, the value of the injection pressure p_24 across the reducing agent dosing valve 24 is approximately equal to the pressure p_36 measured at the pump side using the pressure sensor 36, if both components are situated at the same geodetic height. Both pressures are approximately constant. The pressure scale is plotted on the left-hand abscissa.

The injection pressure p_24 drops sharply immediately after the opening of the reducing agent dosing valve 24, and increases sharply after the closing of the reducing agent dosing valve 24. Subsequently, if the reducing agent dosing valve 24 remains closed, the injection pressure p_24 continues to oscillate intensely. The pressure p_36 measured by means of the pressure sensor 36 initially reacts less intensely to the opening of the reducing agent dosing valve 24, and altogether exhibits smaller vibration amplitudes than the injection pressure p_24.

During the opening duration dt3, the injection pressure p_24 differs, by an offset dp(t), from the reducing agent pressure p_36 prevailing at the pump side. An injection quantity determined for the pressure p_36 possibly measured by means of the pressure sensor 36 is not attained because the injection pressure p_24 is lower than the pressure p_36 prevailing at the pump side. The actually injected reducing agent quantity differs, by a deficit quantity which is dependent on the profile of dp(t), from an injection quantity and actuation duration calculated for the reducing agent pressure p_36.

Figure 5:
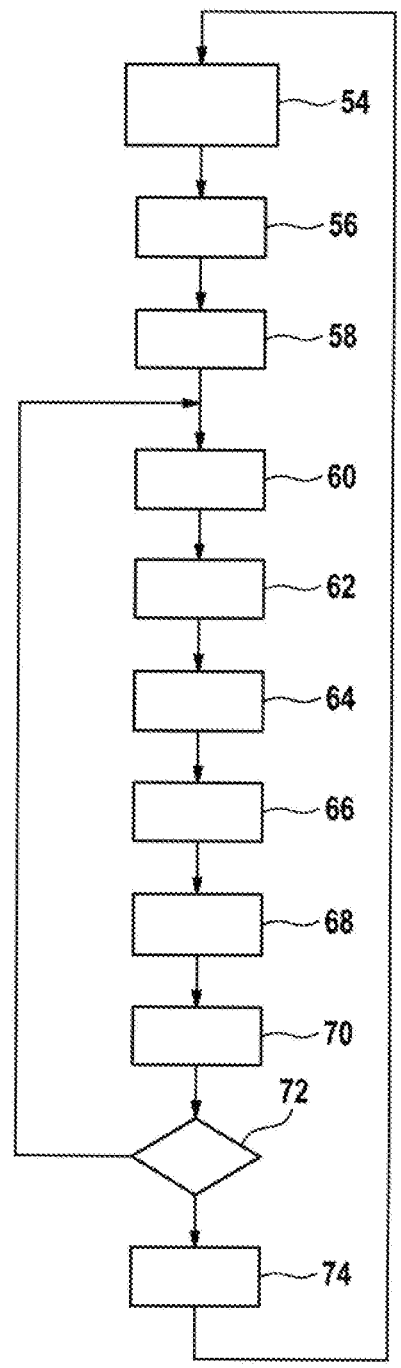
FIG. 5 shows a flow diagram as a first exemplary embodiment of a method according to the invention.

FIG. 5 shows a flow diagram as a first exemplary embodiment of a method according to the invention. Where a step is referred to below, this may also be a program module which has sub-steps. In a main program 54 for the control of the internal combustion engine 10, it is inter alia repeatedly checked whether reducing agent 26 is to be dosed into the exhaust gas. In general, there is a strict separation between the dosing strategy that demands a reducing agent quantity in a manner dependent on the engine actuation and the exhaust-gas sensors, and the SCR control software that calculates inter alia the actuation of the reducing agent dosing valve from said demand. If reducing agent 26 is to be dosed into the exhaust gas, then in a step 56, a setpoint value for the reducing agent quantity, which is to be dosed by means of an injection pulse width, that is to say a current profile 46, or an actuation duration, is determined. Furthermore, the pressure of the reducing agent that is measurable by means of the pressure sensor at the reducing agent pump is detected. If appropriate, a measured exhaust-gas backpressure, or an exhaust-gas backpressure determined by means of a mathematical model, is subtracted from said pressure. If the pressure sensor arranged at the reducing agent pump is an absolute pressure sensor, the ambient pressure that is measurable by an ambient-pressure sensor is preferably subtracted. In the case of height differences of the installation positions of pressure sensor and reducing agent dosing valve, differences in the hydrostatic pressure resulting from this are preferably incorporated into the calculation, so as to yield, overall, as accurate a value as possible for the injection pressure actually acting at the reducing agent dosing valve.

In a manner dependent on said injection pressure and the reducing agent quantity to be dosed, it is likewise also the case in step 56 that an actuation duration is calculated, during which the reducing agent dosing valve is to be actuated with opening action in order to dose said reducing agent quantity.

Subsequently, in a step 58, the reducing agent dosing valve 24 is actuated with opening action. In the step 60, the time t that has elapsed since the opening of the reducing agent dosing valve is measured by means of a timer within the control unit. A measurement of the pump-side pressure p_36(t) is performed in the step 62. Said pressure value is assigned to the measured time t. In the step 64, a pressure offset dp(t) is determined in a manner dependent on the measured time t. This is performed for example by accessing a characteristic curve stored in the control unit 14, which characteristic curve is defined by values of times t and pressure offset values dp(t), which have been learned in advance or determined on a test stand.

In the step 66, the sum of the presently determined values of the pressure p_36 prevailing at the pump side, which is possibly also corrected with exhaust-gas back pressure, ambient pressure and hydrostatic pressure, and of the pressure offset dp(t) is determined. In the case of suitable predetermined values dp(t) for the pressure offset, said sum constitutes a substitute value or estimated value for the actually acting injection pressure p_24. In this way, the injection pressure actually prevailing at the reducing agent dosing valve 24 is replicated.

In the step 68, said sum or said estimated value is assigned a mass flow through the reducing agent dosing valve 24. This is performed in the control unit 14 by accessing a throughflow characteristic curve, which can be addressed with the injection pressure p_24, of the reducing agent dosing valve 24. Said mass flow is integrated in the step 70. The value of the integral thus represents in each case the actual value of the reducing agent quantity that has been injected up to the present time within a coherent actuation duration. Said actual value is, in the step 72, compared with the setpoint value determined in the step 56. For as long as the setpoint value is not reached, the program branches back to the step 60, in which the time that has elapsed since the opening of the reducing agent dosing valve 24 is determined again. The loop composed of steps 60 to 72 is thus run through until the actual value of the setpoint value is reached or exceeded in the step 72. If this is the case, the reducing agent dosing valve is closed in the step 74, and the method returns to the main program, performed in the step 54, for the control of the internal combustion engine.

Figure 6:
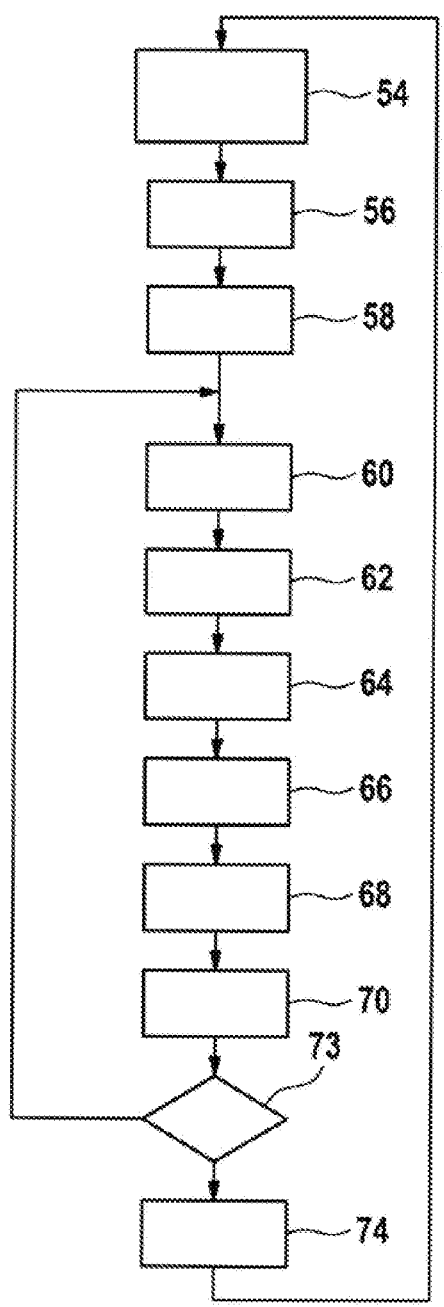
FIG. 6 shows a flow diagram as a second exemplary embodiment of a method according to the invention.

FIG. 6 shows a further preferred exemplary embodiment of a method according to the invention. The steps 54 to 70 are identical to the steps 54 to 70 of FIG. 5. In this exemplary embodiment, the actuation duration for the dosing is firstly determined on the basis of the non-corrected pressure. During the dosing, however, an estimated value for the injection pressure effectively acting at the reducing agent dosing valve is formed continuously as in FIG. 5, and thus the present mass flow through the reducing agent dosing valve is calculated. Said mass flow is integrated during the dosing. Thus, the dosed quantity may deviate from the originally demanded quantity, because it is specifically the case now that the effectively acting injection pressure including the pressure drop has been taken into consideration. The duration of the actuation is however no longer changed during an ongoing actuation.

The value of the integral comprises a component which corresponds to the integral of the mass flow contribution of the pressure offset. Said component represents, in this exemplary embodiment, an estimated value for the influence of the drop in the injection pressure at the inflow connector of the reducing agent dosing valve, which occurs upon the opening of the reducing agent dosing valve, on the injected reducing agent quantity.

Said mass flow is integrated in the step 70. The value of the integral thus represents in each case the actual value of the reducing agent quantity injected up to the present time within a coherent actuation duration. In the step 73, it is checked whether the end of the actuation duration determined in step 56 has been reached. For as long as this is not the case, the program branches back to the step 60, in which the time that has elapsed since the opening of the reducing agent dosing valve 24 is determined again. The loop composed of the steps 60 to 73 is thus run through until the actual actuation duration reaches its setpoint value, that is to say the actuation duration determined in step 56. If this is the case, the reducing agent dosing valve is closed in the step 74. The method thereafter returns to the main program 54.

Figure 7:
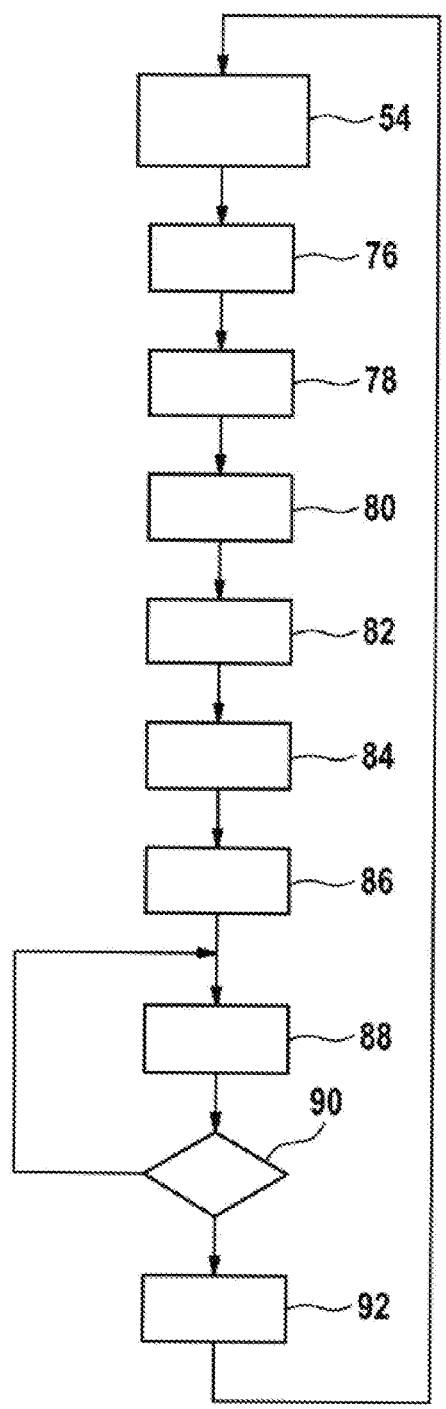
FIG. 7 shows a flow diagram as a third exemplary embodiment of a method according to the invention.

FIG. 7 shows a third exemplary embodiment of a method according to the invention. In this case, too, in a main program 54 for the control of the internal combustion engine 10, it is inter alia repeatedly checked whether reducing agent 26 is to be injected into the exhaust system 12. If this is the case, then in a step 76, a setpoint value for the reducing agent quantity to be injected by means of an opening of the reducing agent dosing valve, which opening lasts for an actuation duration, is formed. In the step 78, the reducing agent pressure p_36 that is measurable at the pump side is detected by means of the pressure sensor 36.

As an alternative to this, if a pressure sensor 36 is not present, then for the further method use is made of a nominal pressure which is physically defined by a pressure-limiting valve connected hydraulically to the feed line 30. The nominal pressure may alternatively also be adhered to through the use of a volumetric principle. If the reducing agent quantity delivered into the system by the delivery pump is exactly determinable (known) and the system is closed (no return line), then the system pressure can be set through quantity equilibrium of the inflowing and outflowing reducing agent mass flows.

In step 80, in a manner dependent on the setpoint value for the quantity to be injected, as determined in step 76, and the reducing agent pressure, as detected in the step 78, a setpoint value for an actuation duration with which the setpoint quantity would be injected if the injection pressure p_24 were equal to the reducing agent pressure p_36 prevailing at the pump side is determined. This assignment may for example be performed with the aid of a characteristic map stored in the control unit 14, in which in each case one value of an actuation duration is assigned to a value pair of reducing agent pressure and quantity setpoint value.

Subsequently, the setpoint value of the actuation duration is, in the step 82, assigned an actuation duration offset which is predetermined such that a lengthening of the actuation duration by said actuation duration offset compensates a deficit quantity caused as a result of the pressure drop of the injection pressure p_24. Values of the actuation duration offset corresponding to this demand are stored in the control unit 14 in the form of a characteristic curve which is addressed with base values of the actuation duration. The different value pairs of the characteristic curve are preferably predetermined by means of test stand tests. In the step 84, the sum of the base value of the actuation duration and the offset of the actuation duration is formed, and in the step 86, the reducing agent dosing valve 24 is opened.

In the step 88, the time duration for which the reducing agent dosing valve 24 has been opened since the opening that took place in the step 86 is measured. In the step 90, said opening duration is compared with the value of the sum formed in the step 84. For as long as the value of the actuation duration respectively updated in the step 88 is lower than the value, serving as a threshold value, of the sum formed in the step 84, the loop composed of the steps 88 and 90 is run through repeatedly. If the opening duration reaches or overshoots the threshold value, then in the step 92, the reducing agent dosing valve 24 is closed. The method then subsequently branches back to the step 54, in which the remaining control of the internal combustion engine 10 is performed.

In this exemplary embodiment, the actuation duration offset constitutes an estimated value for the influence of the drop in the injection pressure at the inflow connector of the reducing agent dosing valve, which occurs upon the opening of the reducing agent dosing valve, on the injected reducing agent quantity.

Figure 8:
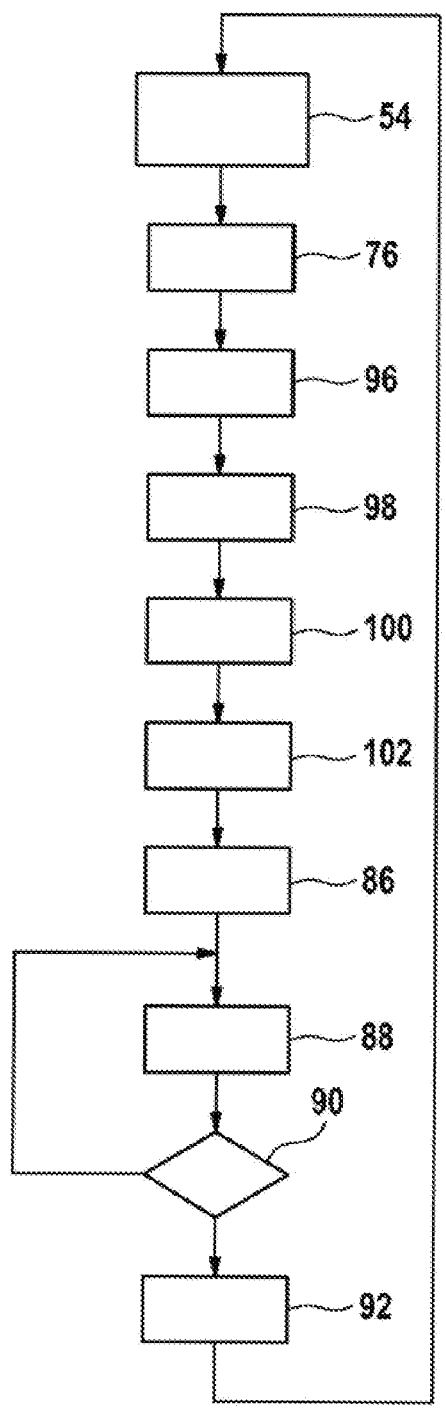
FIG. 8 shows a flow diagram as a fourth exemplary embodiment of a method according to the invention.

FIG. 8 shows a fourth exemplary embodiment of a method according to the invention. The fourth exemplary embodiment differs from the third exemplary embodiment in that the correction is performed not on the basis of an actuation duration but on the basis of a reducing agent quantity. The steps 54, 76 and 86 to 92 of the fourth exemplary embodiment are identical to the steps 54, 76 and 86 to 92 of the third exemplary embodiment. In the fourth exemplary embodiment, the step 76 is followed by a step 96 in which a deficit quantity caused as a result of the drop in the injection pressure p_24 is determined as a reducing agent quantity offset as a function of the quantity setpoint value formed in the step 76. This is performed for example by accessing a predetermined characteristic curve stored in the control unit 14. In the step 98, a sum of the quantity setpoint value determined in the step 76 and the offset formed in the step 96 is formed. In the step 100, the reducing agent pressure p_36 prevailing at the pump side is detected. As already described, this is performed using the pressure sensor 36. As an alternative to this, a physically predefined nominal value for the pressure is used. In the step 102, the actuation duration, that is to say the injection pulse width of a current profile 46 with which the reducing agent dosing valve 24 is actuated with opening action, is formed as a function of the sum formed in the step 98 and of the pressure detected in the step 100. This is performed for example with the aid of a characteristic map stored in the control unit 14, in which in each case one value of the actuation duration is stored versus a value pair of quantity and pressure.

In this exemplary embodiment, the reducing agent quantity offset, that is to say the deficit quantity determined in the step 96, constitutes an estimated value for the influence of the drop in the injection pressure at the inflow connector of the reducing agent dosing valve, which occurs upon the opening of the reducing agent dosing valve, on the injected reducing agent quantity.

The invention claimed is:
1. A method for actuating an electrically controllable reducing agent dosing valve (24) which is arranged on an exhaust system (12) of an internal combustion engine (10), has an injection opening projecting into the exhaust system (12), and has a feed connector, which feed connector is hydraulically connected by means of a feed line (30) to a pump (32) which generates an injection pressure (p_24) at the feed connector, having a control unit (14) which is connected to a control connector of the reducing agent dosing valve (24) and which actuates the reducing agent dosing valve (24) with actuation signals, to which the reducing agent dosing valve (24) reacts with an opening action which takes place as a result of hydraulic connection of the feed connector to the injection opening, wherein the actuation signals are formed in a manner dependent on a reducing agent pressure (p_36) prevailing at the pump-side end of the feed line (32),
    wherein the actuation signals are formed additionally in a manner dependent on at least one estimated value for an influence of a drop in the injection pressure (p_24), which occurs at the feed connector of the reducing agent dosing valve (24) upon the opening of the reducing agent dosing valve (24), on the injected reducing agent quantity, and
    wherein the at least one estimated value is determined on the basis of data stored in the control unit (14), which data, for predetermined actuation durations of the actuation signals, indicate predetermined offsets (dp(t)) with respect to a reducing agent pressure (p_36) prevailing at the pump-side end.

2. The method according to claim 1, characterized in that a setpoint value for a reducing agent quantity for injection is determined, the reducing agent dosing valve (24) is actuated with opening action, an instantaneous value for the pressure (p_24) prevailing at the feed connector of the reducing agent dosing valve (24) is repeatedly determined from a reducing agent pressure (p_36) prevailing at the pump-side end and the offset (dp(t)), an actual value of the reducing agent quantity injected during the already ongoing opening of the reducing agent dosing valve (24) is determined on the basis of the instantaneous values and is compared with the setpoint value, and the actuation with opening action is ended if the actual value reaches the setpoint value.

3. The method according to claim 1, wherein a setpoint value for a reducing agent quantity for injection and an actuation duration, required for the injection of said reducing agent quantity, of an actuation signal that acts so as to open the reducing agent dosing valve are determined, wherein the reducing agent dosing valve is actuated with opening action, wherein an instantaneous value for the pressure (p_24) prevailing at the feed connector of the reducing agent dosing valve (24) is repeatedly determined from a reducing agent pressure (p_36) prevailing at the pump-side end and the offset (dp(t)), an actual value of the reducing agent quantity injected during the already ongoing opening of the reducing agent dosing valve (24) is determined on the basis of the instantaneous values, an actual actuation duration that has elapsed since the start of the actuation with opening action is repeatedly determined, and wherein the elapsed actual actuation duration is compared with a setpoint value of the actuation duration, and the actuation with opening action is ended if the elapsed actual actuation duration reaches the setpoint value of the actuation duration.

4. The method according to claim 1, characterized in that the value for the reducing agent pressure (p_36) prevailing at the pump-side end is determined using a pressure sensor (36) disposed thereat.

5. The method according to claim 1, characterized in that the value for the reducing agent pressure (p_36) prevailing at the pump-side end is a predetermined nominal pressure.

6. The method according to claim 1, characterized in that the at least one estimated value indicates in each case one deficit quantity that is predetermined for a setpoint value of the actuation duration of an actuation signal or a predetermined base value of the reducing agent quantity.

7. The method according to claim 6, characterized in that the deficit quantities are read out of a memory of the control unit which, for this purpose, is addressed with the predetermined setpoint values of the actuation durations or base values of the reducing agent quantity.

8. The method according to claim 6, characterized in that, in the formation of the actuation signals, a setpoint value for a reducing agent quantity for injection is determined, and in that the setpoint value of an actuation duration of an actuation signal is determined as a function of a predetermined nominal value or reducing agent pressure (p_36) measured at the pump-side end, in that, from the setpoint value of the actuation duration, by accessing data stored in the control unit (14), a deficit quantity is determined which arises owing to a pressure drop (dp(t)) that can be expected during the opening of the reducing agent dosing valve (24), an additional duration is determined such that a lengthening of the setpoint value of the actuation duration by the additional duration leads to the injection of an additional quantity which compensates the deficit quantity, a sum of the additional duration and the setpoint value of the actuation duration is formed and is used for the actuation with opening action, an instantaneous value for the pressure (p_24) prevailing at the feed connector of the reducing agent dosing valve (24) is repeatedly determined from a reducing agent pressure (p_36) prevailing at the pump-side end and the offset (dp(t)), an actual value of the reducing agent quantity injected during the already ongoing opening of the reducing agent dosing valve (24) is determined on the basis of the instantaneous values, an actual actuation duration that has elapsed since the start of the actuation with opening action is repeatedly determined, and the elapsed actual actuation duration is compared with the value of the sum, and the actuation with opening action is ended if the elapsed actual actuation duration reaches the value of the sum.

9. A reducing agent dosing device having a pump (32), having a control unit (14) and having an electrically controllable reducing agent dosing valve (24), wherein the control unit (14) is configured for actuating the reducing agent dosing valve (24), wherein the reducing agent dosing valve (24) is arranged on an exhaust system (12) of an internal combustion engine (10) and has an injection opening projecting into the exhaust system (12) during the use of said reducing agent dosing valve, and has a feed connector, which feed connector is hydraulically connected by means of a feed line (30) to the pump (32), which generates an injection pressure (p_24) at the feed connector, and wherein the control unit (14) is connected to a control connector of the reducing agent dosing valve (24) and actuates the reducing agent dosing valve (24) with actuation signals, to which the reducing agent dosing valve (24) reacts with an opening action which takes place as a result of hydraulic connection of the feed connector to the injection opening, wherein the control unit (14) forms the actuation signals in a manner dependent on a reducing agent pressure (p_36) prevailing at the pump-side end of the feed line (30), characterized in that the control unit (14) is designed to form an estimated value for an influence of a drop in the injection pressure (p_24), which occurs at the feed connector of the reducing agent dosing valve (24) upon the opening of the reducing agent dosing valve (24), on the injected reducing agent quantity, and to form the actuation signals additionally in a manner dependent on the estimated value wherein the control unit (14) is programmed to control a sequence of the method according to claim 1.

10. A reducing agent dosing device for an exhaust system (12) of an internal combustion engine (10) comprising:
an electrically controllable reducing agent dosing valve (24) arranged on the exhaust system (12) downstream from an oxidation catalytic convertor (20), the reducing agent dosing valve (24) having an injection opening projecting into the exhaust system (12);
a pump (32) for providing a reducing agent through a feed line (30) to the reducing agent dosing valve (24);
a reducing agent pressure sensor (36) disposed near the pump (32) to determine a reducing agent pressure (p_36) prevailing at a pump-side end of the feed line (30); and
a control unit (14) connected to the pump (32) for providing an operating signal thereto, and connected to the reducing agent pressure sensor (36) to receive the reducing agent pressure, wherein the control unit (14) is configured to:
actuate the reducing agent dosing valve (24) with actuation signals, to which the reducing agent dosing valve (24) reacts with an opening action which takes place as a result of hydraulic connection of the feed connector to the injection opening,
form the actuation signals in a manner dependent on a reducing agent pressure (p_36) prevailing at the pump-side end of the feed line (30),
form an estimated value for an influence of a drop in the injection pressure (p_24), which occurs at the feed connector of the reducing agent dosing valve (24) upon the opening of the reducing agent dosing valve (24) on the injected reducing agent quantity on the basis of data stored in the control unit (14), which data, for predetermined actuation durations of the actuation signals, indicate predetermined offsets with respect to a reducing agent pressure prevailing at the pump-side end, and
form the actuation signals additionally in a manner dependent on the estimated value.

11. The reducing agent dosing device according to claim 10, wherein the control unit (14) is configured to determine a setpoint value for a reducing agent quantity for injection, and wherein when the reducing agent dosing valve (24) is actuated with opening action, an instantaneous value for the pressure (p_24) prevailing at the feed connector of the reducing agent dosing valve (24) is repeatedly determined from a reducing agent pressure (p_36) prevailing at the pump-side end and the offset, wherein an actual value of the reducing agent quantity injected during the already ongoing opening of the reducing agent dosing valve (24) is determined on the basis of the instantaneous values and is compared with the setpoint value, and the actuation with opening action is ended when the actual value reaches the setpoint value.

12. The reducing agent dosing device according to claim 10, wherein the control unit (14) is configured to determine a setpoint value for an actuation duration, and wherein when the reducing agent dosing valve (24) is actuated with opening action, an instantaneous value for the pressure (p_24) prevailing at the feed connector of the reducing agent dosing valve (24) is repeatedly determined from a reducing agent pressure (p_36) prevailing at the pump-side end and the offset, wherein an actual value of the reducing agent quantity injected during the already ongoing opening of the reducing agent dosing valve (24) is determined on the basis of the instantaneous values, wherein an actual actuation duration that has elapsed since the start of the actuation with opening action is repeatedly determined, and wherein the elapsed actual actuation duration is compared with the setpoint value of the actuation duration, and the actuation with opening action is ended when the elapsed actual actuation duration reaches the setpoint value of the actuation duration.

13. The method according to claim 1, characterized in that a setpoint value for a reducing agent quantity for injection is determined, the reducing agent dosing valve (24) is actuated with opening action, and an instantaneous value for the pressure ($p\_24$) prevailing at the feed connector of the reducing agent dosing valve (24) is repeatedly determined.

14. The method according to claim 1, wherein a setpoint value for a reducing agent quantity for injection and an actuation duration, required for the injection of said reducing agent quantity, of an actuation signal that acts so as to open the reducing agent dosing valve are determined, wherein the reducing agent dosing valve is actuated with opening action.

* * * * *